United States Patent [19]

Hani et al.

[11] Patent Number: 5,098,473
[45] Date of Patent: * Mar. 24, 1992

[54] PROCESS FOR STABILIZING ZINC PYRITHIONE PLUS CUPROUS OXIDE IN PAINT

[75] Inventors: Rahim Hani, Cheshire; Craig Waldron, Waterbury; Douglas A. Farmer, Jr., Madison, all of Conn.

[73] Assignee: Olin Corporation, Cheshire, Conn.

[*] Notice: The portion of the term of this patent subsequent to Oct. 15, 2008 has been disclaimed.

[21] Appl. No.: 664,015

[22] Filed: Mar. 4, 1991

[51] Int. Cl.⁵ .............................................. C09D 5/14
[52] U.S. Cl. ............................ 106/18.33; 106/15.05; 106/16; 106/18.34; 514/188; 514/345; 514/499; 514/500
[58] Field of Search .................... 106/15.05, 16, 18.33, 106/18.34; 514/188, 345, 499, 500

[56] References Cited

U.S. PATENT DOCUMENTS

| | | | |
|---|---|---|---|
| 3,615,744 | 8/1977 | Yokoo et al. | 106/15 |
| 4,039,312 | 8/1977 | Patru | 71/67 |
| 4,581,351 | 4/1986 | Berke et al. | 514/188 |
| 4,918,147 | 4/1990 | Yamamori et al. | 429/78 |

Primary Examiner—William R. Dixon, Jr.
Assistant Examiner—Anthony J. Green
Attorney, Agent, or Firm—Dale Lynn Carlson

[57] ABSTRACT

The present invention relates generally to paints and paint bases, and, more specifically to a process for providing a stable gel-free dispersion of zinc pyrithione plus cuprous oxide biocide in paint. In accordance with the process of the present invention, the zinc pyrithione is purified to a purity assay of at least 98% in order to provide gellation-inhibition in the paint.

8 Claims, No Drawings

PROCESS FOR STABILIZING ZINC PYRITHIONE PLUS CUPROUS OXIDE IN PAINT

FIELD OF THE INVENTION

The present invention relates generally to paints and paint bases, and, more specifically to a process for providing a stable, gel-free dispersion of zinc pyrithione plus cuprous oxide biocide in paint.

BACKGROUND OF THE INVENTION

Combinations of zinc pyrithione and cuprous oxide are known to be excellent antifouling agents when formulated into paints and paint bases (i.e., the paint before pigment addition), as disclosed, for example, in co-pending U.S. application Ser. No. 07/518,602. Unfortunately, however, such paints have now been found to thicken or gel unacceptably within a few days, at best, or a few hours, at worst, when formulated with typical commercial grades of zinc pyrithione in combination with cuprous oxide.

Heretofore, the solution to the problem of gellation of paints containing zinc pyrithione in combination with cuprous oxide has not been known to the knowledge of the present inventors. A solution to the problem would be highly desired by the paint manufacturing community since this combination of biocides provides excellent biocidal activity.

SUMMARY OF THE INVENTION

In one aspect, the present invention relates to A process for providing a gellation-inhibited paint or paint base containing zinc pyrithione and cuprous oxide which comprises the steps of:

(a) purifying crude zinc pyrithione to remove at least a portion of the impurities therefrom, thereby providing purified zinc pyrithione having a purity assay of at least 98% as measured by iodometric titration, (b) adding said purified zinc pyrithione and also adding cuprous oxide to a paint or paint base to provide a paint or paint base characterized by enhanced biocidal efficacy and resistance to gellation, said zinc pyrithione being present in an amount of between about 1% and about 25% (preferably 5-25%, more preferably 10-25%), and said cuprous oxide being present in an amount of between about 20% and about 70%, the total amount of said pyrithione salt plus said cuprous oxide being between about 21% and about 80%, said percents being based upon the total weight of the paint or paint base.

In another aspect, the present invention relates to a paint or paint base composition characterized by enhanced biocidal efficacy and gellation resistance wherein the paint or paint base contains a biocide consisting essentially of cuprous oxide and purified zinc pyrithione, said purified zinc pyrithione having a purity assay of at least 98% as measured by iodometric titration.

These and other aspects of the invention will become apparent upon reading the following detailed description of the invention.

DETAILED DESCRIPTION OF THE INVENTION

Although the improved biocidal efficacy and gellation resistance advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides highly desirable results in the context of exterior paints of both the latex and alkyl types.

The purification technique used to purify the zinc pyrithione can be any suitable technique, preferably extraction or recrystallization utilizing a solvent or a solvent/non-solvent pair. Suitable solvents include the following: water, lower alkyl ($C_1$–$C_6$) alcohols, lower alkyl ($C_1$–$C_6$) and cycloalkyl ethers, chlorinated lower alkanes ($C_1$–$C_6$), 1,2-lower alkane ($C_1$–$C_6$) diols, and mono-, di-, and tri-lower alkyl ($C_1$–$C_6$) benzene, and the like. The exact solvent is not critical. Any solvent capable of relatively removing impurities, and that the results zinc pyrithione has an assay of at least 98% and preferably 99% by iodometric titration will suffice.

Typically, a paint composition will contain a resin, a pigment, and various optional additives such as thickening agent(s), wetting agents, and the like, as is well-known in the art. The resin is preferably selected from the group consisting of vinyl, alkyl, epoxy, acrylic, polyurethane and polyester resins, and combinations thereof. The resin is preferably employed in an amount of between about 20% and about 80% based upon the weight of the paint or paint base.

In addition, the paint composition of the present invention optionally additionally contains optional additives which have a favorable influence on the viscosity, the wetting power and the dispersibility, as well as on the stability to freezing and electrolytes and on the foaming properties. If a marine paint is being fabricated, the paint preferably contains a swelling agent to cause the paint to gradually "slough off" in its marine environment, thereby causing renewed biocidal efficacy of newly exposed biocide (i.e., the pyrithione salt plus the copper salt) at the surface of the paint in contact with the water medium of the marine environment. Illustrative swelling agents are naturally-occurring or synthetic clays, such as kaolin, montomorillonite (bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired "sloughing off" effect. Swelling agents can be used singly or in combination. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol), poly (vinylpyrolidone), poly(ethylene-glycol), salts of poly(acrylic acid) and salts of acrylic acid/acrylamide copolymers.

Suitable wetting and dispersing agents include sodium polyphosphate, salts of low-molecular-weight poly(acrylic acid), salts of poly(ethane-sulfonic acid), salts of poly (vinyl-phosphonic acid), salts of poly(maleic acid) and salts of copolymers of maleic acid with ethylene, 1-olefins with 3 to 18 carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or oxethylated compounds, for example reaction products of ethylene oxide with long-chain alkanols, amines, carboxylic acids, carboxylic acid amides, alkyl phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzine or alkylated aromatic hydrocarbons. As defoaming agents there are suitable for example poly(propylene-glycol) and polysiloxanes.

The paint composition of the present invention may be used as a paint for natural or synthetic materials, for example wood, paper, metals, textiles and plastics. It is particularly suitable as an outdoor paint, and is excellent for use as a marine paint.

The invention is further illustrated by the following Examples, Unless otherwise stated, the "parts" and "%" are "parts by weight" and "percent by weight", respectively.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

Comparative Example A

Demonstration of Gellation Results in a Paint Containing Cuprous Oxide Plus Crude Zinc Pyrithione A paint was prepared using the following formulations:

The solvent mixture used as a 1:2:1 mixture of xylene, MIBK and carbitol acetate (called mixed solvent).

The zinc pyrithione used was standard commercial grade and assayed 97.8% pure by iodometric titration.

| Material | Mass (g) | % |
| --- | --- | --- |
| VAGH resin (1) | 9.3 | 2.8 |
| DISPERBYK 163 (2) | 5.1 | 1.5 |
| Tributyl phosphate | 6.45 | 2.0 |
| Cuprous oxide | 136.5 | 41.4 |
| TITANOX (3) | 7.5 | 2.3 |
| Zinc pyrithione powder | 25.5 | 7.7 |
| Wood Rosin | 6.3 | 1.9 |

-continued

| Material | Mass (g) | % |
| --- | --- | --- |
| Solvent Mixture | 133.0 | 40.0 |

(1) vinyl chloride-vinyl acetate-vinyl alcohol terpolymer, a product of Union Carbide Corporation.
(2) a high molecular weight block copolymer, a Product of BYK-Chemie.
(3) titanium dioxide, a product of DuPont Company.
The procedure employed for preparing the paint was as follows:
(1) A one pint paint can was charged with 41.93 g of a 22.2% VAGH resin solution in a 2:1 mixture by volume of MIBK and xylene.
(2) A mixture of 5.1 g Disperbyk and 5.1 g mixed solvent was added.
(3) Tributyl phosphate was added to the paint can and mixed with a high speed disperser at 1000 RPM for 10 minutes.
(4) The cuprous oxide, zinc pyrithione, titanox, and 10.8 g carbitol acetate were added to the paint can and mixing was continued at 7000 RPM for 1 hr.
(5) The mixing speed was reduced to 2500 RPM and 35 g of mixed solvent was added.
(6) Once the temperature dropped from 45° C. to below 35°, a solution of 6.3 g of wood rosin in 50 g of mixed solvent was added to the can and the mixture was mixed for 1.0 hr. at 2500 RPM.

The paint formulation made according to this procedure was of suitable viscosity for application by brush immediately after preparation, but thickened to an unpourable paste after approximately 6 hours.

EXAMPLE 1

Demonstration of Reduced Gellation in a Paint Containing Cuprous Oxide Plus Referred Zinc Pyrithione A paint was prepared using the following formulation:

The zinc pyrithione used in this formulation was purified by washing sequentially with water, methanol and tetralydrofuran and drying under reduced pressure overnight. The washing procedure was to scurry the cured zinc pyrithione in 3 times its weight of solvent, agitate briefly, and then review the solvent by filtration. Drying was done only after the final wash. Its assay by iodometric titration was 98.5%.

| Material | Mass (g) | % |
| --- | --- | --- |
| VAGH resin | 9.3 | 2.8 |
| DISPERBYK 163 | 5.1 | 1.5 |
| Tributyl phosphate | 5.45 | 2.0 |
| Cuprous oxide | 135.5 | 41.4 |
| TITANOX (titanium oxide) | 7.5 | 2.3 |
| Purified zinc PYRITHIONE | 25.5 | 7.7 |
| Wood Rosin | 6.3 | 1.9 |
| Solvent Mixture | 133.0 | 40.0 |

Procedure

The same procedure was employed as used in Comparative Example A described above. This paint remained of suitable viscosity for application by brush for 2 weeks, then thickened somewhat.

EXAMPLE 2

The procedure of Comparative Example A and Example 1 was followed exactly except that the zinc pyrithione in this case was rigorously purified by recrystallization from chloroform so that its assay by iodometric titration was 99.8%. The paint made using this grade of zinc pyrithione retained its original viscosity 10 weeks after preparation and showed no tendency to thicken after storage for that amount of time.

What is claimed is:

1. A paint or paint base composition characterized by enhanced biocidal efficacy and gellation resistance wherein the paint or paint base contains a biocide consisting essentially of cuprous oxide and purified zinc pyrithione, said zinc pyrithione being present in an amount of between about 1% and about 25%, and said cuprous oxide being present in an amount of between about 20% and about 70%, the total amount of said pyrithione salt plus said cuprous oxide being between about 21% and about 80%, said percents being based upon the total weight of the paint or paint base, and said purified zinc pyrithione having a purity assay of at least 98% as measured by iodometric titration.

2. The paint or paint base of claim 1 which additionally contains a swelling agent selected from the group consisting of natural and synthetic clay and natural and synthetic polymer swelling agents, and wherein the swelling agent is present in an amount of between about 1% and about 5% by weight based upon the total weight of the paint or paint base.

3. The paint or paint base of claim 2 wherein said swelling agent is selected from the group consisting of kaolin, montomorillonite (bentonite), clay mica (muscovite), and chlorite (hectonite), and combinations thereof.

4. The paint or paint base composition of claim 1 wherein said purity assay is at least 99%.

5. A process for providing a gellation-inhibited paint or paint base containing zinc pyrithione and cuprous oxide which comprises the steps of:
 (a) purifying crude zinc pyrithione to remove at least a portion of the impurities therefrom, thereby providing purified zinc pyrithione having a purity assay of at least 98% as measured by iodometric titration,
 (b) adding said purified zinc pyrithione and also adding cuprous oxide to a paint or paint base to provide a paint or paint base characterized by enhanced biocidal efficacy and resistance to gellation, said zinc pyrithione being present in an amount of between about 1% and about 25%, and said cuprous oxide being present in an amount of between about 20% and about 70%, the total amount of said pyrithione salt plus said cuprous oxide being between about 21% and about 80%, said weight percents being based upon the total weight of the paint or paint base.

6. The process of claim 1 wherein said paint or paint base additionally contains a swelling agent selected from the group consisting of natural and synthetic clay and natural and synthetic polymer swelling agents, and wherein the swelling agent is present in an amount of between about 1% and 5% by weight based upon the total weight of the paint or paint base.

7. The process of claim 6 wherein said swelling agent is selected from the group consisting of kaolin, montomorillonite (bentonite), clay mica (muscovite), and chlorite (hectonite), and combinations thereof.

8. The process of claim 5 wherein said purity assay is at least 99%.

* * * * *